United States Patent [19]
Thomas

[11] 3,959,974
[45] June 1, 1976

[54] INTERNAL COMBUSTION ENGINE
[76] Inventor: Luther B. Thomas, 153 Herndon Ave., Shreveport, La. 71101
[22] Filed: Sept. 19, 1974
[21] Appl. No.: 507,555

[52] U.S. Cl. ............................... 60/712; 123/25 R; 123/1 R; 123/119 C; 123/71 R; 92/176
[51] Int. Cl.² ......................................... F01B 29/04
[58] Field of Search ............. 123/25 R, 25 B, 25 A, 123/25 P, 119 C, 1 A, 1 R, 3, 32 SA, 26, 70 R, 71 R, 32 AH, 188 A; 60/712, 619, 622; 92/172, 176

[56] References Cited
UNITED STATES PATENTS

| | | | |
|---|---|---|---|
| 1,068,414 | 7/1913 | Courtenay | 123/25 P |
| 1,247,983 | 11/1917 | Medanich | 123/188 A |
| 1,319,679 | 10/1919 | Parrish | 60/617 |
| 1,332,633 | 3/1920 | Parrish | 60/617 |
| 1,516,310 | 11/1924 | Ryan | 123/188 A |
| 1,629,677 | 5/1927 | Bull | 60/712 X |
| 1,670,965 | 5/1928 | Heron | 123/188 A |
| 2,001,577 | 5/1935 | Johnson | 60/712 |
| 2,212,167 | 8/1940 | Peterson | 60/620 X |
| 2,217,192 | 10/1940 | Wuehr | 60/617 X |
| 2,522,649 | 9/1950 | Tenney | 123/70 R |
| 2,671,311 | 3/1954 | Rohrbach | 60/617 X |
| 2,939,441 | 6/1960 | Luttrell | 123/70 R |
| 3,623,463 | 11/1971 | De Uries | 92/176 X |
| 3,842,808 | 10/1974 | Cataldo | 123/25 R X |
| 3,880,126 | 4/1975 | Thurston et al. | 123/70 R |

*Primary Examiner*—Charles J. Myhre
*Assistant Examiner*—Ira S. Lazarus
*Attorney, Agent, or Firm*—D. Paul Weaver

[57] ABSTRACT

An internal combustion engine utilizes a combustion cylinder formed in part of material which can withstand high temperatures in conjunction with a displacement or power piston having a ringless section capable of withstanding high temperatures and being backed up by a relatively low temperature lubricated ringed piston section. Means to inject fuel and water into the combustion chamber is provided along with means to charge the combustion chamber with air and to exhaust the combustion chamber near the end of the power stroke.

6 Claims, 4 Drawing Figures

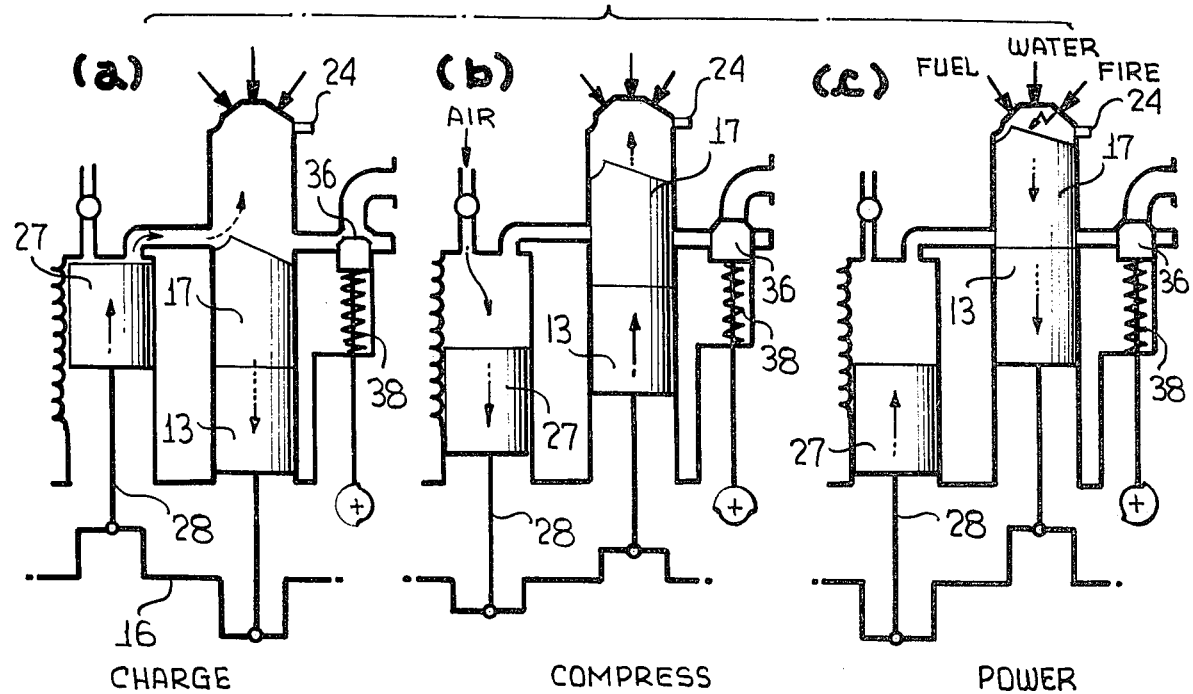
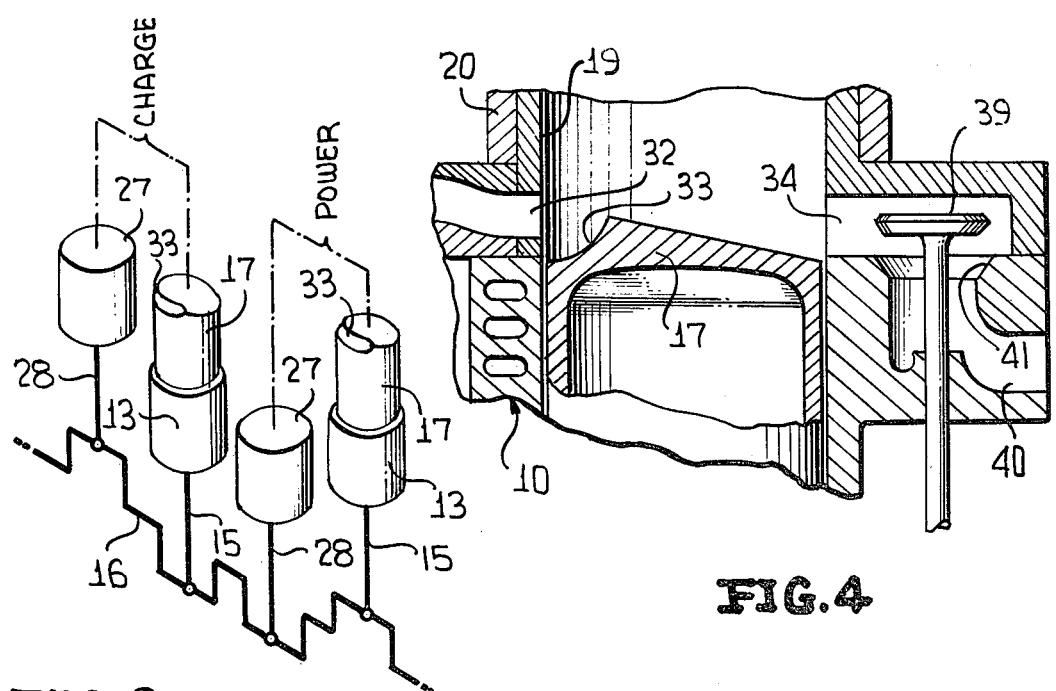

INTERNAL COMBUSTION ENGINE

BACKGROUND OF THE INVENTION

The prior art contains a number of teachings relative to water injection in internal combustion engines, allegedly to improve the efficiency thereof. Some examples of the patented prior art are contained in U.S. Pat. Nos. 1,332,633; 2,879,753; 2,212,167 and 3,074,228. In general, such engines have not proven to be successful and have not been widely adopted commercially. The principal reason for this lack of success of water injected engines is their inability to operate at the high temperatures necessary to produce super-heated steam in the combustion chamber.

Customarily, the pistons of an internal combustion engine are sealed with piston rings and these rings require lubrication. The operational temperature of the engine is therefore limited to the highest temperature at which the lubricant can stand up, and such temperature is not sufficiently elevated to produce super-heated steam which the engine must produce to achieve the desired efficiency and to prevent water from entering the oil of the engine.

The present invention is believed to satisfy the key to providing a completely successful engine of the above class in which water is injected into the combustion chamber at desirable intervals to produce super-heated steam. This is accomplished in the invention by the provision of a unique ringless piston section formed of high temperature resistant material which may operate within a combustion chamber or cylinder of similar material with a relatively large clearance. This high temperature "displacement piston section" is backed up by a conventional ringed piston which operates in a relatively low temperature portion of the cylinder and which may be conventionally lubricated.

Additionally, the invention comprises means to charge the combustion cylinder or cylinders with air and to exhaust the combustion chamber at proper intervals. It includes means to inject fuel and water into the combustion chamber in accordance with a desired cycle of operation, an initial fuel igniter means and a heat sensing unit capable of detecting the temperature condition at which the engine can begin a fuel conserving alternate diesel steam cycle of operation.

Among the objectives realized by the invention are a more complete combustion of fuel by burning the fuel at higher temperatures than those attainable in known engines; the utilization of heat which is normally wasted to produce super-heated steam, and allowing this steam to expand on the power piston to obtain more power from the engine; to provide for cooling the engine by spraying water into the combustion chamber to control the temperature therein; and to provide control means to assure that water cannot be injected at temperatures below those necessary to produce super-heated steam.

The key element in achieving the first objective of more complete combustion under higher engine temperatures is the previously-mentioned ringless heat-resistant displacement piston which operates in the high temperature resistant power cylinder.

The air charging means for the engine may include a companion cylinder-piston unit adjacent each power cylinder with coordinated intake and exhaust valves, or the engine could be charged with a turbo-type supercharger.

With the former type of cylinder-piston engine charger, the engine will be built in multiples of the working and charging cylinder pairs, such as two, four, six or eight cylinders in the engine.

Other objects and advantages of the invention will become apparent during the course of the following description.

BRIEF DESCRIPTION OF DRAWING FIGURES

FIG. 1 is a diagrammatic view showing the operating cycle of an engine embodying the invention.

FIG. 3 is a partly diagrammatic perspective view of pistons employed in the engine.

FIG. 4 is a fragmentary section showing a modified type of exhaust valve.

DETAILED DESCRIPTION

Figure 2:
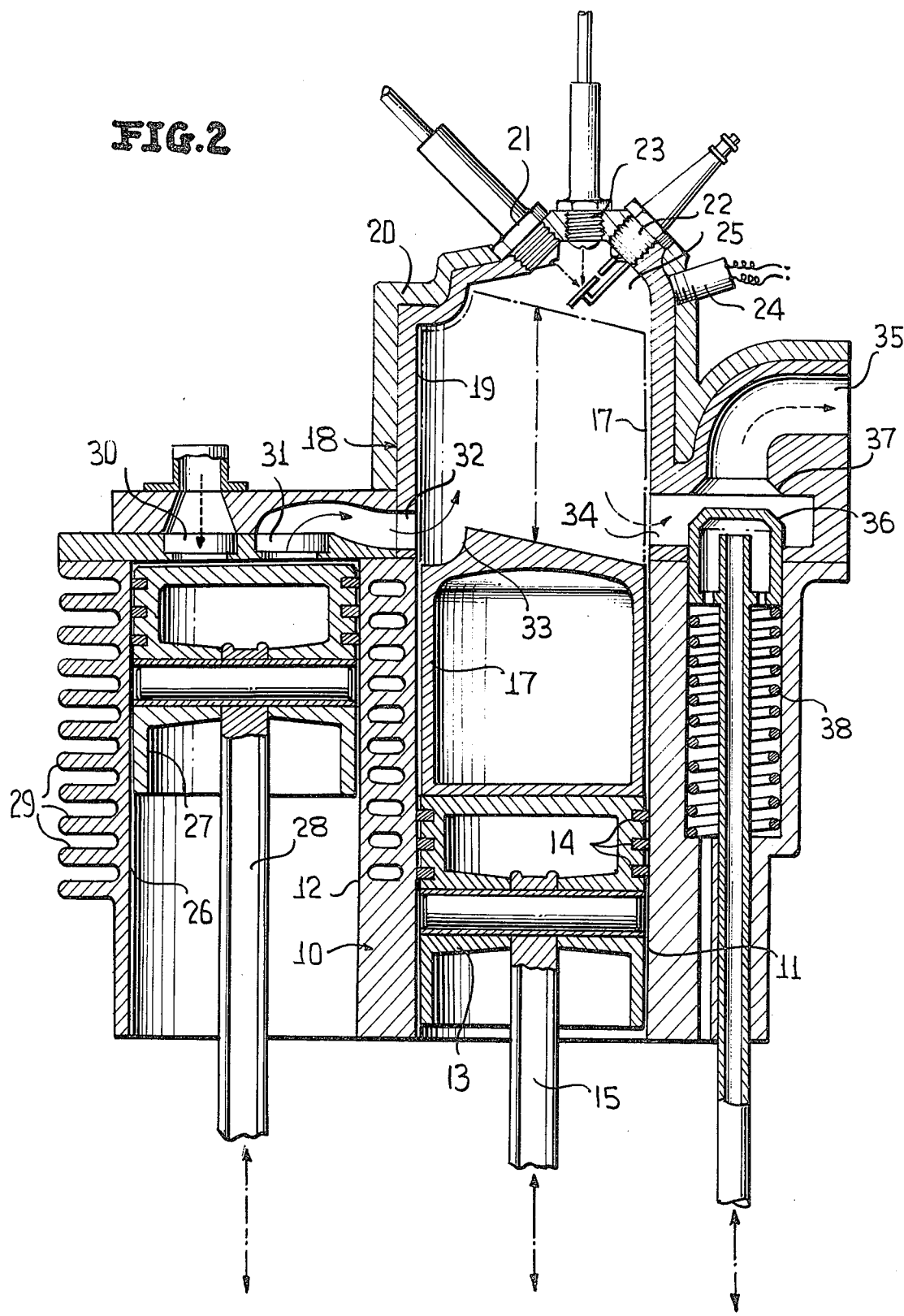
FIG. 2 is a typical vertical cross section through one power cylinder of the engine and the companion feeding or charging cylinder and associated elements.

Referring to the drawings in detail, wherein like numerals designate like parts, the numeral 10 designates an engine block which is bored to produce a side-by-side pair of power and charging cylinders 11 and 12 or multiples of such cylinders to make a four, six or eight cylinder engine. The power cylinder 11 receives a power piston 13 having piston rings 14 to seal the piston with respect to the wall of cylinder 11. These rings receive lubrication in any usual manner. The piston 13 is connected by a rod 15 to a crank shaft 16, not shown in FIG. 2, but shown diagrammatically in FIGS. 1 and 3.

Atop the ringed piston 13 and rigidly secured thereto is a displacement piston or piston section 17 forming a key element of the invention. This displacement piston is without rings and requires no lubrication and has a relatively large clearance in the cylinder bore 11 and does not slidably contact the cylinder bore or wall. It is formed of a metal alloy such as those used in gas turbine engines so as to be highly heat resistant. It may also be formed in some cases from ceramics or metal-ceramics to withstand operating temperatures of 1000°F. or higher.

Normally, piston sections 13 and 17 are made from different materials to withstand the relatively lower and higher temperatures to which these parts are subjected. However, in some cases, the two parts of the piston structure may be formed as a unit from one and the same material, in which case the material will be capable of withstanding the very high temperatures in the upper cylinder portion and the more usual or normal operating temperatures in the lower cylinder portion. Such heat-resistant materials in either case are readily available.

The engine also involves a head 18 in which is formed an upper extension of cylinder 11 providing a high temperature cylinder portion 19 and combustion chamber in which the displacement piston 17 operates. The material forming cylinder portion 19 is also a heat-resistant alloy or ceramic or combustion material. The displacement piston 17 has the same clearance in the upper chamber 19 as provided for in the main cylinder 11 therebelow. The ringed piston 13, which can operate only in the lower temperature region of the engine due to the presence of luricant, never enters the high temperature cylinder portion 19 and only the piston 17 enters this portion, as shown in the drawings. The engine head 18 and particularly high temperature cylinder portion 19 is enclosed by a layer of heat insulation 20.

As with the piston structure, in some cases, the power cylinder can be constructed of a single material possessing the necessary heat-resistant properties instead of different materials for the upper and lower cylinder portions, as illustrated.

At the top of cylinder portion 19, a fuel injector nozzle means 21 is provided in opposing relation to an igniter or plug 22. A water injecting nozzle means 23 is arranged between these two elements, at the top of the head, and a conventional heat sensor 24 is also mounted in close proximity to the combustion space 25 at the top of the power cylinder.

Means are provided to charge the chamber 19 with air and to exhaust the power cylinder in timed relationship to the operation of the power or working piston assembly composed of elements 13 and 17. The charging means in the embodiment shown consists of a cylinder 26 arranged at one side of the cylinder 11 in parallel relation and receiving a ringed charging piston 27 connected by a rod 28 to the crank shaft 16 180° out of phase with the power piston. The lower portion of the block 10 near the piston 13 is not subject to very high temperatures and may be air cooled, and the cylinder or cylinders 26 are also air cooled as by fins 29 or the like.

An extension of the head 18 above cylinder 26 contains an air intake valve 30 and a charging valve 31 which admits the charge compressed by piston 27 through a port 32 into the power cylinder 19 above displacement piston 17 when the latter is at or near bottom dead center. A deflector shoulder 33 on piston 17 causes the charge of air to flow upwardly toard the combustion zone 25.

The engine is also equipped with an exhaust port 34 at each power cylinder, such port preferably being opposite the air intake port 32 to encourage scavenging of exhaust gases in the direction shown by the broken arrows in FIG. 2. A suitable exhaust manifold 35 communicates with the port 34, as indicated.

Each power cylinder has an exhaust valve 36 adapted to be seated at 37 by a spring 38 in closing relation to the port 34. The exhaust valve will be open at the proper times by camming means, not shown. In FIG. 2, there is illustrated a lubricant cooled form of exhaust valve. However, in some instances, a cooled exhaust valve may not be needed, in which case the simpler and more conventional form of exhaust valve 39 shown in FIG. 4 will be employed. In such case, the exhaust port 34 communicates with a manifold 40 and a seat 41 for exhaust valve 39 is provided without provision for oil cooling. The preferred form of exhaust vale is illustrated in FIG. 4, although in some cases a liquid cooled valve may be preferable.

SUMMARY OF OPERATION

Air for combustion is drawn into the engine through intake valve 30 by charger piston 27 when the latter moes downwardly. This piston is 180° out of phase with the power piston composed of sections 13 and 17, as stated. When piston 27 begins to move upwardly, the charge of air is delivered through valve 31 and port 32 into chamber 19 above displacement piston 17. Displacement piston 17, FIG. 2, is at the bottom of its stroke when charging piston 27 reaches the top of its stroke and the incoming air will be deflected upwardly by shoulder 33.

As piston 13 with displacement piston 17 starts to move upwardly, the exhaust valve 36 closes and air is trapped in the high temperature chamber 19. This air is compressed by the ringless high temperature displacement piston 17 into the confines of chamber of combustion space 25. At this point, fuel is injected through injector 21 and ignited by plug 22 to start the engine operation. After cylinder section 19 and piston 17 become hot, the engine will begin a compression ignition or diesel operation and the plug 22 will no longer be needed. In this connection, it is possible to build the engine as a full diesel without a spark plug or igniter.

The piston assembly 17-13 is driven downwardly on the power stroke by the hot expanding gases on top of displacement piston 17. The exhaust valve 36 will open just before piston 13 reaches the bottom of the power stroke. When piston assembly 17-13 moves up on the next compression stroke, piston 27 will move downwardly on another air intake stroke.

After the engine is running in the described manner, fuel is injected and ignited each time piston 17 is at the top of its compression stroke. This piston and cylinder portion 19 will become extremely hot, above 1000°F., heat being held in by insulation 20. When the temperature is sufficiently high to produce super-heated steam, as detected by heat sensor 24, the cycle of engine operation will change automatically. Instead of fuel being injected each time piston 17 is at the top of its stroke, fuel will be injected only on every second revolution, and between these injections of fuel, on alternate revolutions, a fine spray of water will be injected by the nozzle means 23 into combustion space 25. This water entering extremely hot cylinder portion 19 and striking hot displacement piston 17 will produce high pressure super-heated steam, and this high pressure steam will furnish a power stroke for the engine without consuming any fuel on that revolution. Additionally, the heat absorbed in making the steam will help to cool the engine and maintain a desirable operating temperature. In this way, heat normally wasted in an engine is put to use. Heat or energy normally dissipated through a radiator will be used to produce work, and will then go out through the exhaust. The engine will now continue to operate on an alternate steam-diesel power cycle, as described.

It is to be understood tht the form of the invention herewith shown and described is to be aken as a preferred example of the same, and that various changes in the shape, size and arrangement of parts may be resorted to, without departing from the spirit of the invention or scope of the subjoined claims.

I claim:

1. An internal combustion engine comprising a power cylinder having an upper high temperature portion and a lower relatively low temperature portion, a power piston within the power cylinder including an upper displacement portion for operation in said upper high temperature cylinder portion and being ringless and sized for relatively large clearance within the power cylinder, said power piston also including a ringed portion below said upper displacement portion and operating within said lower relatively low temperature portion of the power cylinder, means for feeding charges of pressurized air to the interior of the power cylinder above said displacement portion of the power piston and for cyclically exhausting the power cylinder, fuel injection means on the top portion of the power cylinder to inject fuel therein when the displacement portion of the power piston is within said upper high temperature portion of the power cylinder, and water injection means on the power cylinder to inject water into the top of the upper high temperature cylinder portion alternately with injections of fuel therein when the combustion chamber is sufficiently hot to produce super-heated steam.

2. An internal combustion engine as defined by claim 1, and a heat sensor means connected with the power cylinder to monitor the temperature in the combustion chamber thereof for the purpose of initiating an alternate water and fuel injection cycle of operation.

3. An internal combustion engine as defined by claim 1, and said means for feeding charges of air comprising a cylinder-piston unit adjacent said power cylinder and including a piston operating substantially 180° out of phase with the power piston, an air intake valve and an air supply valve on said cylinder-piston unit with the supply valve in communication with the interior of the power cylinder.

4. An internal combustion engine as defined by claim 1, and said means for cyclically exhausting the power cylinder including an exhaust valve operating in timed relation to the operation of the power piston.

5. An internal combustion engine as defined by claim 1, wherein said upper displacement portion of the power piston is formed separately from the ringed portion thereof and is formed of a different material from the ringed portion and is rigidly secured to the top of the ringed portion.

6. An internal combustion engine as defined by claim 1, wherein the upper and lower portions of the power cylinder have the same diameters and are formed of two different materials, and the upper and lower portions of the power pistion are also separately formed from two different materials with the upper displacement portion of the power piston appreciably smaller in diameter than the lower ringed portion which slidably engages the relatively low temperature portion of the power cylinder and receives lubrication therein.

\* \* \* \* \*